US009181853B2

United States Patent
Leone et al.

(10) Patent No.: US 9,181,853 B2
(45) Date of Patent: Nov. 10, 2015

(54) INTERCOOLER CONDENSATE TO SUMP OR POSITIVE CRANKCASE VENTILATION FLOW

(71) Applicant: Ford Global Technologies, LLC, Dearborn, MI (US)

(72) Inventors: Thomas G. Leone, Ypsilanti, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 13/707,468

(22) Filed: Dec. 6, 2012

(65) Prior Publication Data

US 2014/0158096 A1    Jun. 12, 2014

(51) Int. Cl.
*F02B 33/00* (2006.01)
*F02B 25/06* (2006.01)
*F02B 29/04* (2006.01)
*F02B 33/44* (2006.01)
*F01M 13/00* (2006.01)

(52) U.S. Cl.
CPC ............ *F02B 29/0468* (2013.01); *F01M 13/00* (2013.01); *Y02T 10/146* (2013.01)

(58) Field of Classification Search
CPC ...... F02B 29/0468; F02B 29/04; F01M 13/00
USPC .............................. 60/599; 123/572–574, 563
See application file for complete search history.

(56) References Cited

U.S. PATENT DOCUMENTS

| 5,878,731 | A  | * | 3/1999  | Bedkowski ............... 123/573 |
| 6,301,887 | B1 | * | 10/2001 | Gorel et al. ............... 60/605.2 |
| 7,131,263 | B1 | * | 11/2006 | Styles ............... 60/278 |
| 7,980,076 | B2 |   | 7/2011  | Buia et al. |
| 8,061,135 | B2 |   | 11/2011 | Rutherford |
| 8,118,013 | B2 |   | 2/2012  | Arvan |
| 8,191,366 | B2 | * | 6/2012  | Taylor ............... 60/599 |
| 2008/0083399 | A1 | * | 4/2008 | Hirano et al. ............... 123/572 |
| 2009/0013977 | A1 | * | 1/2009 | Brecheisen, II ............... 123/563 |
| 2010/0229549 | A1 | * | 9/2010 | Taylor ............... 60/599 |
| 2011/0083650 | A1 | * | 4/2011 | Mordukhovich et al. ..... 123/573 |
| 2011/0094219 | A1 |   | 4/2011  | Palm |
| 2011/0107760 | A1 | * | 5/2011 | Quinn et al. ............... 60/599 |

(Continued)

FOREIGN PATENT DOCUMENTS

| DE | 3935789 | A  | * | 5/1991 |
| DE | 4105529 | A1 | * | 8/1992 |

(Continued)

OTHER PUBLICATIONS

DE 3935789 English Translation.*

(Continued)

*Primary Examiner* — Thai Ba Trieu
*Assistant Examiner* — Jessica Kebea
(74) *Attorney, Agent, or Firm* — Julia Voutyras; Alleman Hall McCoy Russell & Tuttle LLP (57) ABSTRACT

Methods and systems are provided for removing condensate from a charge air cooler. Condensate may be drained from the charge air cooler and introduced into a positive crankcase ventilation flow or an engine oil sump. Introducing condensate into the engine oil sump may be controlled based on conditions of the engine oil sump and stored condensate.

16 Claims, 4 Drawing Sheets

(56) References Cited

U.S. PATENT DOCUMENTS

2013/0019845 A1* 1/2013 Meyer .......................... 123/542
2014/0083398 A1* 3/2014 Marceno et al. ......... 123/568.12

FOREIGN PATENT DOCUMENTS

| | | | |
|---|---|---|---|
| DE | 19714308 B4 | * | 5/2007 |
| FR | 2553827 A1 | * | 4/1985 |
| FR | 2959779 A1 | * | 11/2011 |
| JP | 61182419 A | * | 8/1986 |
| JP | 10121972 A | * | 5/1998 |
| JP | 2009215915 A | * | 9/2009 |
| WO | WO 2014064500 A1 | * | 5/2014 |

OTHER PUBLICATIONS

DE 19714308 B4 English Translation.*
English Translation DE 19714308.*
DE 4105529 A1 Englsih Translation.*

* cited by examiner

INTERCOOLER CONDENSATE TO SUMP OR POSITIVE CRANKCASE VENTILATION FLOW

BACKGROUND/SUMMARY

Turbocharged and supercharged engines may be configured to compress ambient air entering the engine in order to increase power. Compression of the air may cause an increase in air temperature, thus, an intercooler or charge air cooler (CAC) may be utilized to cool the heated air thereby increasing its density and further increasing the potential power of the engine. Condensate may form in the CAC when the ambient air temperature decreases, or during humid or rainy weather conditions, where the intake air is cooled below the water dew point. Condensate may collect at the bottom of the CAC, or in the internal passages, and cooling turbulators. When torque is increased, such as during acceleration, increased mass air flow may strip the condensate from the CAC, drawing it into the engine and increasing the likelihood of engine misfire and combustion instability.

One approach to address condensate formation in the CAC may involve draining condensate from the CAC to the intake manifold of the engine. However, this method may not allow for adequate vaporization of the condensate before entering the engine. Thus, liquid condensate entering the engine may cause combustion instability and misfire.

In one example, the issues described above may be addressed by a method for draining condensate from a charge air cooler and introducing the condensate to at least one of a positive crankcase ventilation flow or an engine oil sump. Specifically, the condensate may be drained into a liquid storage reservoir, positioned adjacent to an engine block or exhaust manifold to allow evaporation of the liquid condensate. Water vapor may then enter the crankcase ventilation flow into the engine and/or liquid condensate may enter the engine oil sump for evaporation and disposal. In this way, the condensate may be evaporated and disposed of in a way that reduces the potential for engine misfire.

In one example, condensate may automatically drain from the charge air cooler into the liquid storage reservoir. A drain valve or orifice may be used to control flow of liquid condensate into the engine oil sump. For example, a controller may adjust the drain valve in response to conditions of the liquid storage reservoir and the engine oil sump. The conditions of the liquid storage reservoir and the engine oil sump may include a liquid condensate level in the liquid storage reservoir, an oil temperature in the engine oil sump, a pressure difference between the liquid storage reservoir and the engine oil sump, and a fluid level in the engine oil sump. For example, the drain valve may open when the liquid condensate level in the liquid storage level is greater than a threshold level, the oil temperature is greater than a threshold temperature, the pressure difference between the liquid storage reservoir and the engine oil sump is less than a threshold difference, and the fluid level in the engine oil sump is less than a threshold fluid level. In this way, the drain valve may be adjusted to allow disposal of liquid condensate into an engine oil sump where it may evaporate.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
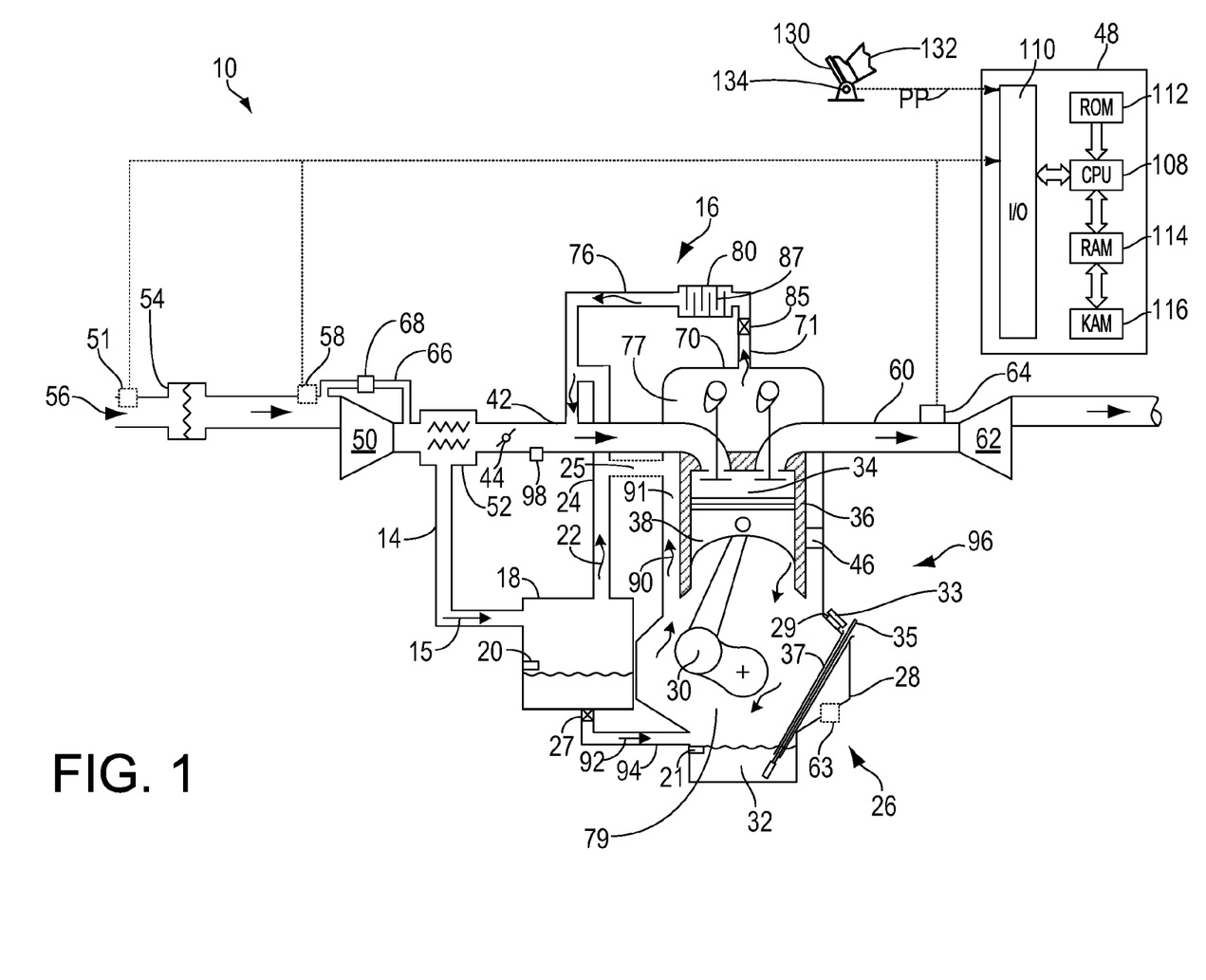
FIGS. 1-2 show schematic diagrams of an example engine system including a positive crankcase ventilation system.
Figure 2:
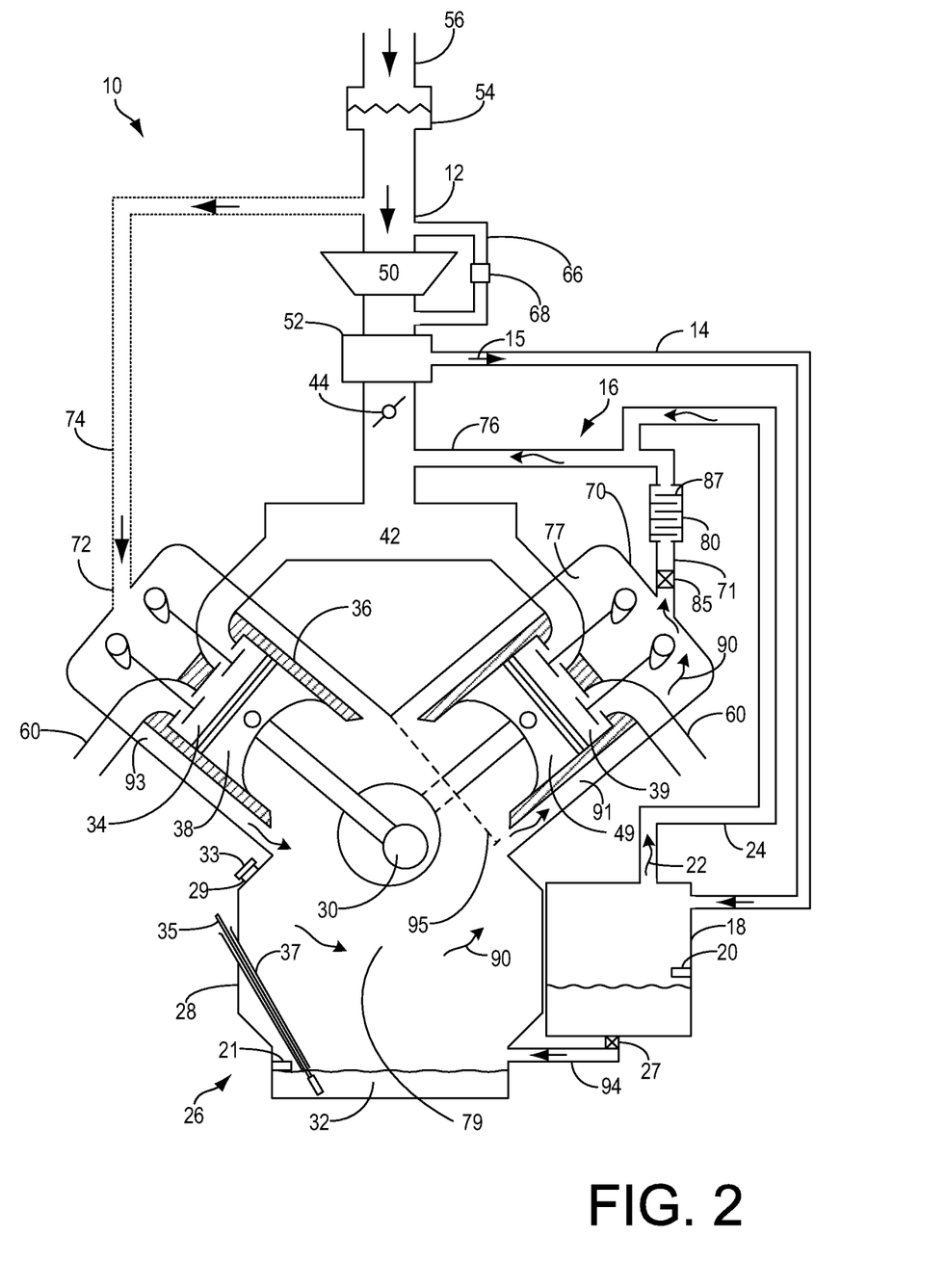

The following description relates to systems and methods for draining condensate from a charge air cooler (CAC) and introducing the condensate into at least one of a positive crankcase ventilation flow and an engine oil sump of an engine system, such as the engine system shown in FIGS. 1-2. Liquid condensate may be drained into a liquid storage reservoir where some of the liquid may evaporate into water vapor. The water vapor may exit the liquid storage reservoir and enter the positive crankcase ventilation flow. The liquid condensate stored in the reservoir may be drained into the engine oil sump for evaporation and disposal. A drain valve in the liquid storage reservoir may control the flow of liquid condensate into the engine oil sump. An example method for adjusting the drain valve in response to liquid storage reservoir and engine oil sump conditions is presented at FIG. 3. Example drain valve adjustments in response to these conditions are shown at FIG. 4.

Referring now to FIG. 1, it shows an example system configuration of a multi-cylinder engine, generally depicted at 10, which may be included in a propulsion system of an automobile. Engine 10 may be controlled at least partially by a control system including controller 48 and by input from a vehicle operator 132 via an input device 130. In this example, input device 130 includes an accelerator pedal and a pedal position sensor 134 for generating a proportional pedal position signal PP.

Engine 10 may include a lower portion of the engine block 96, indicated generally at 26, which may include a crankcase 28 encasing a crankshaft 30 with engine oil sump 32 positioned below the crankshaft. An oil fill port 29 may be disposed in crankcase 28 so that oil may be supplied to engine oil sump 32. Oil fill port 29 may include an oil cap 33 to seal oil port 29 when the engine is in operation. A dip stick tube 37 may also be disposed in crankcase 28 and may include a dipstick 35 for measuring a level of oil in engine oil sump 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 96 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injectors (not shown) and intake air from intake manifold 42 which is positioned downstream of throttle 44. The engine block 96 may also include an engine coolant temperature (ECT) sensor 46 input into an engine controller 48.

A throttle 44 may be disposed in the engine intake to control the airflow entering intake manifold 42 and may be preceded upstream by compressor 50 followed by charge air cooler 52, for example. An air filter 54 may be positioned upstream compressor 50 and may filter fresh air entering intake passage 56. In some examples, a compressor bypass conduit 66 may be coupled upstream and downstream of compressor 50. Compressor bypass conduit 66 may include a compressor bypass valve 68 to control an amount of air entering compressor 50. Compressor bypass conduit may be coupled to intake manifold 42 upstream of charge air cooler 52.

As shown in FIG. 1, compressor 50 is coupled, through charge air cooler (CAC) 52 to throttle valve 44. The CAC may be an air-to-air or air-to-water heat exchanger, for example. From the compressor, the hot compressed air charge enters the inlet of the CAC 52, cools as it travels through the CAC, and then exits to pass through the throttle valve to the intake manifold. In the embodiment shown in FIG. 1, the pressure of the air charge within the intake manifold is sensed by manifold air pressure (MAP) sensor 98. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Additionally, condensate may collect at the bottom of the CAC, and then be drawn into the engine at once during acceleration (or tip-in) increasing the chance of engine misfire.

In one example, condensate collection in the CAC may be reduced by draining condensate from the CAC. The condensate may then be introduced to other parts of the engine system for disposal. Liquid condensate may not be tolerated by the engine and may cause misfire when ingested. However, small amounts of water vapor or gases may be tolerated by the engine. Thus, by evaporating the liquid condensate from the CAC, the evaporated condensate may be introduced into the engine through other engine systems for disposal, while reducing misfire. For example, evaporated condensate may enter a crankcase ventilation flow of crankcase gases traveling toward the intake manifold. In another example, condensate may be drained into the engine oil sump for disposal. After the condensate enters the engine oil sump, the liquid condensate may evaporate into the lower region 79 of the crankcase. Further details on draining condensate and introducing the condensate into the crankcase ventilation flow and/or the engine oil sump are presented below with reference to FIG. 2-4.

Exhaust combustion gases exit the combustion chamber 34 via exhaust manifold 60 located upstream of turbine 62. An exhaust gas sensor 64 may be disposed in exhaust manifold 60 upstream of turbine 62. Turbine 62 may be equipped with a wastegate bypassing it. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 48.

In the example of FIG. 1, a positive crankcase ventilation system 16 is coupled to the engine intake so that gases in the crankcase may be vented in a controlled manner from the crankcase. Crankcase ventilation system 16 includes a crankcase outlet 71 coupled to the intake manifold 42, downstream of throttle 44. In one example, crankcase outlet 71 may be coupled to a cylinder valve cover 70 or some other region along a head of a cylinder. The crankcase ventilation system vents air out of the crankcase and into intake manifold 42 via conduit 76.

During engine operation, a small amount of fuel and exhaust gas may escape between the piston 38 and chamber walls 36 and enter the crankcase 28. This may be referred to as blowby. As the engine degrades over time, blowby may increase. The gases that escape into the crankcase may be referred to as crankcase gases 90. Crankcase gases 90 may circulate in the lower region 79 of the crankcase and travel in an upward direction, along passage 91 and toward the upper region 77 of the crankcase, near the head of the cylinder. Crankcase gases 90 may exit the crankcase through crankcase outlet 71 and travel along conduit 76 to the intake manifold 42.

In some embodiments, crankcase ventilation system 16 may further include a unidirectional check valve, or positive crankcase ventilation valve 85 disposed in the crankcase outlet 71. The positive crankcase ventilation valve 85 directs flow of crankcase ventilation gases in a direction from the crankcase outlet 71 to the intake manifold 42 and restricts backflow of crankcase ventilation gases from the crankcase outlet 71 back into the crankcase 28.

Crankcase ventilation system 16 may also include an oil separator 80 coupled to the crankcase outlet 71, disposed in conduit 76. Oil separator 80 filters oil from vapors, or crankcase gases 90, exiting crankcase 28 before they re-enter the intake manifold 42. Oil separator 80 includes a plurality of baffles 87 or other surfaces which permit flow of ventilation gases therethrough while separating oil from the ventilation gases exiting crankcase 28.

As discussed above, condensate in the CAC may be reduced by draining condensate from the CAC and introducing the condensate into one or more of the positive crankcase ventilation flow and the engine oil sump. In one embodiment, as shown in FIGS. 1-2, the condensate may drain from the CAC into a liquid storage reservoir 18 before introducing it into the positive crankcase ventilation flow and engine oil sump. In an alternate embodiment, condensate may drain directly into the engine oil sump without entering a reservoir.

In the embodiment shown in FIGS. 1-2, condensate 15 drains from CAC 52, along an automatic drain tube or condensate passage 14 into liquid storage reservoir 18. The liquid storage reservoir 18 may be positioned adjacent a block of the engine (e.g., the engine block 96). In another example, the liquid storage reservoir may be positioned adjacent the exhaust manifold. By positioning the liquid storage reservoir in this way, liquid condensate may evaporate into water vapor in the liquid storage reservoir. Liquid condensate may collect at the bottom of liquid storage reservoir 18. A fluid level sensor 20 disposed in the reservoir may estimate and/or measure the liquid condensate level (e.g., fluid level) in the liquid storage reservoir. At least a portion of the liquid condensate, or water, may evaporate in the liquid storage reservoir, the water vapor 22 may then enter conduit 24, coupled to conduit 76 of the crankcase ventilation system. Water vapor may enter the crankcase ventilation flow at conduit 76, upstream of the intake manifold 42. The combined water vapor and crankcase gases in the crankcase ventilation flow may then enter the intake manifold 42 for disposal and combustion in the engine cylinders. In an alternate embodiment, water vapor 22 may enter the crankcase ventilation flow, upstream of the oil separator 80, through optional conduit 25, coupled between conduit 24 and passage 91 of the crankcase. The water vapor may then mix with crankcase gases 90 and enter conduit 76 via the crankcase outlet 71. In another example, conduit 25 may be coupled between conduit 24 and conduit 76, upstream of the oil separator 80.

Liquid condensate in the liquid storage reservoir 18 may enter the engine oil sump 32 through fluid passage 94. Fluid passage 94 may be coupled to the liquid storage reservoir through an orifice (not shown) or drain valve 27. In one example, the flow of liquid condensate 92 may be directed through a specifically-sized orifice to control flow of condensate into the engine oil sump. The size of the orifice may be determined based on a rate of evaporation of condensate in the liquid storage reservoir and removal of water vapor by the positive crankcase ventilation flow. The size of the orifice may be pre-determined for a specific engine configuration. For example, different sized engine components, such as CAC size or liquid storage reservoir size, may further dictate the size of the orifice.

In another example, as shown in FIG. 1, a drain valve 27 may be used instead of the orifice. Drain valve 27 may be adjusted between an open and a closed position by controller 48 to control the flow of liquid condensate 92 from the liquid storage reservoir into the engine oil sump (e.g., engine sump). The drain valve may be adjusted in response to conditions of the liquid storage reservoir and the engine oil sump. The conditions of the liquid storage reservoir and the engine sump may include a liquid condensate level in the liquid storage reservoir, an oil temperature in the engine sump, a pressure difference between the liquid storage reservoir and the engine sump, and a fluid level in the engine sump. For example, the drain valve may be opened (including opened from a closed position, opened to a greater degree, etc.) in response to the liquid condensate level in the liquid storage reservoir being greater than a first threshold level, the oil temperature being greater than a threshold temperature, the pressure difference between the liquid storage reservoir and the engine oil sump being less than a threshold difference, and the fluid level in the engine oil sump being less than a threshold fluid level. The first threshold level of water in the liquid storage reservoir may be based on the size of the liquid storage reservoir and the rate of evaporation of condensate in the liquid storage reservoir and removal of water vapor by the positive crankcase ventilation flow. For example, the first threshold level may increase with a larger liquid storage reservoir and/or a faster rate of evaporation. The threshold temperature of the oil may be based on the temperature at which liquid condensate, or water, may evaporate in the lower region of the crankcase. For example, if the oil temperature is below the threshold temperature, water directed into the engine oil sump may not evaporate. Thus, the drain valve may remain closed under this condition. The threshold difference of pressure between the liquid storage reservoir and the engine oil sump may correspond to a flow rate of fluid into the engine oil sump. For example, a larger pressure difference may result in a faster flow rate when the drain valve is opened. If the flow rate of fluid into the engine oil sump is too high, the fluid level in the engine oil sump may increase too quickly. In this example, the fluid evaporation rate in the engine oil sump may be lower than the flow rate of fluid into the engine sump, possibly causing the fluid level to increase over a maximum fluid level. Thus, the threshold fluid level in the engine oil sump used to control the drain valve may be based on the fluid evaporation rate in the engine oil sump.

If all of the conditions for opening the drain valve are not met, the drain valve may not be opened. However, if the conditions are met and the drain valve is opened, condensate may be drained from the liquid storage reservoir into the engine oil sump until additional conditions are reached. For example, after opening the drain valve to drain condensate to the engine oil sump, the drain valve may be closed in response to the liquid condensate level in the liquid storage reservoir reaching or decreasing below a second threshold level or the fluid level in the engine oil sump reaching the threshold fluid level. Drain valve 27 may be controlled in response to the above conditions by controller 48, described further below.

Controller 48 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 48 may receive various signals from various sensors coupled to engine 10, engine coolant temperature (ECT) from temperature sensor 46; exhaust gas air/fuel ratio from exhaust gas sensor 64; and other PCV sensors such as a pressure sensor 63 in the crankcase, barometric pressure (BP) sensor 51, compressor inlet pressure (CIP) sensor 58, etc. Controller 48 may also receive signals from a fluid level sensor 20 in the liquid storage reservoir and a fluid level sensor 21 in the engine oil sump. Controller 48 may further control engine actuators such as the drain valve 27 responsive to various received signals. Storage medium read-only memory 112 can be programmed with computer readable data representing instructions executable by processor 108 for performing the methods described below, as well as other variants that are anticipated but not specifically listed.

FIG. 2 shows a schematic view of an engine with a crankcase ventilation system and two engine cylinders. The numbered elements shown in FIG. 2 correspond to like numbered elements shown in FIG. 1 described above.

FIG. 2 shows two cylinders of an engine, a first cylinder 34 with piston 38, and a second cylinder 39 with piston 49. In one example, the first cylinder may be at least partially restricted from the second cylinder 39 and/or other cylinders in the engine by barrier or restriction element 95. As in FIG. 1, engine 10 may include a crankcase ventilation system 16. In some embodiments, shown in FIG. 2, a fresh air inlet 72 may be coupled to fresh air intake 12 via a breather or vent tube 74. The crankcase ventilation system 16 may draw air into crankcase 28 via the breather or vent tube 74. In some examples, vent tube 74 may be coupled to fresh air intake 12 upstream of compressor 50. In some examples, breather tube may be coupled to air filter 54. In other examples, breather tube may be coupled to fresh air intake 12 downstream of air filter 54.

In the example shown in FIG. 2, fresh air may enter the crankcase through the vent tube 74 and fresh air inlet 72. Air may travel down passage 93 to the lower portion of the engine block, indicated generally at 26, and combine with crankcase gases 90. Crankcase gases 90 may then travel toward the upper region 77 of the crankcase, through passage 91. Crankcase gases may exit the crankcase, passing through a unidirectional check valve, or positive crankcase ventilation valve 85. Though FIG. 1 shows positive crankcase ventilation valve 85 disposed in the crankcase outlet 71, in some examples the positive crankcase ventilation valve may instead be disposed in the fresh air inlet 72. Further, in other examples, positive crankcase ventilation valve 85 may be disposed in vent tube 74 or in conduit 76. In still other examples, a positive crankcase ventilation valve may be disposed in both the fresh air inlet 72 and/or the crankcase outlet 71. The valve may be constructed in a number of ways including a reed valve or a duckbill valve, for example.

In this way, condensate may be drained from a CAC into a liquid storage reservoir. The drained condensate may be introduced to at least one of a positive crankcase ventilation flow and an engine oil sump. The drained condensate may include drained liquid condensate, at least a portion of which may evaporate in the liquid storage reservoir. The liquid condensate may be directed from the liquid storage reservoir to the engine oil sump while the evaporated portion may be directed to the crankcase ventilation flow. The crankcase ventilation flow may be directed into the intake manifold of the engine. The flow of condensate may be directed through a drain valve to control the flow of condensate into the engine oil sump. A controller may adjust the drain valve based on a pressure difference between a liquid storage reservoir and the engine oil sump, a liquid condensate level in the liquid storage reservoir, an oil temperature, a fluid level in the engine oil sump, and an estimated rate of evaporation in the engine oil sump. In this way, condensate may be drained from the CAC, evaporated, and disposed of in a way that reduces engine misfire.

Figure 3:
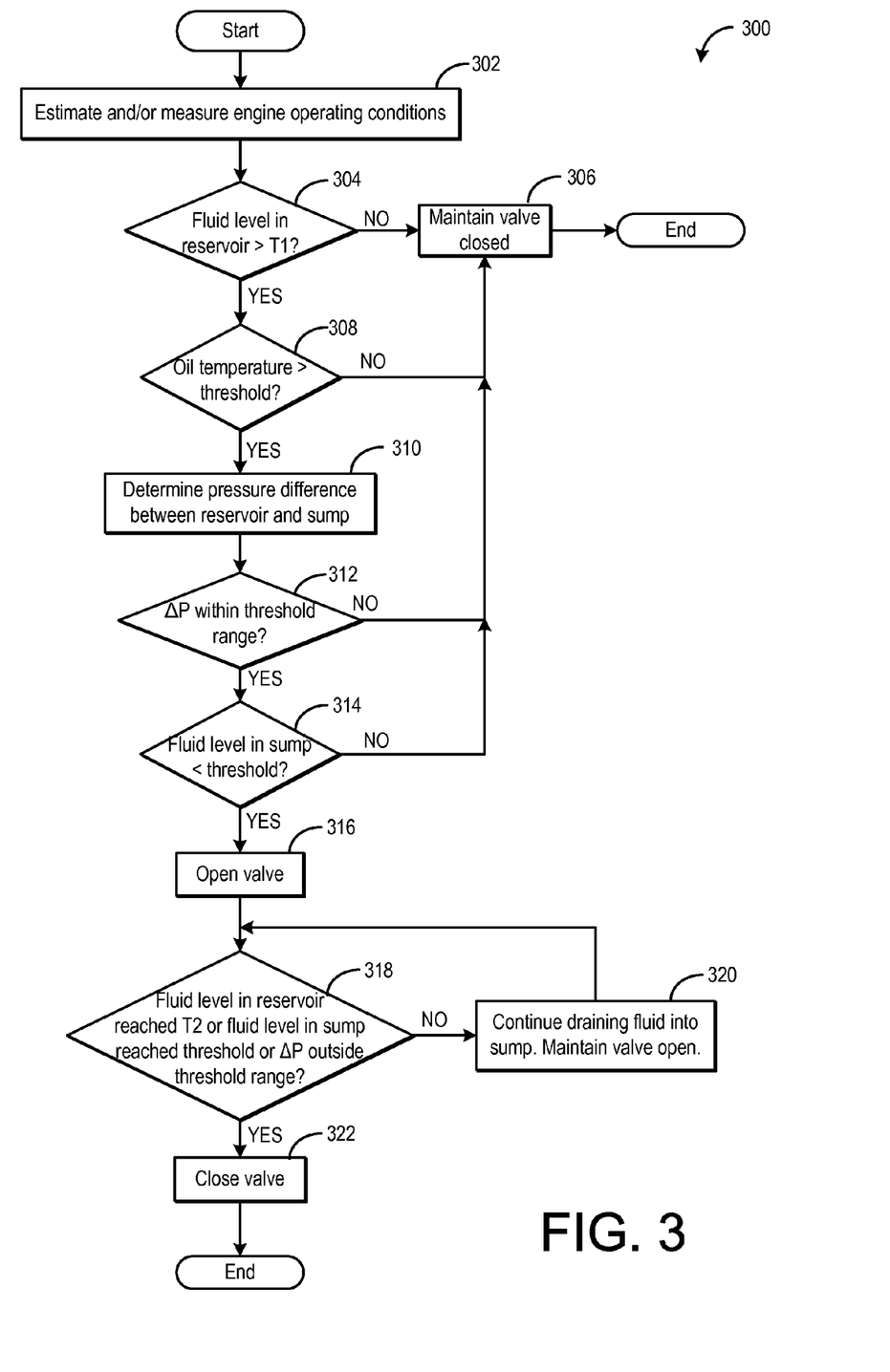
FIG. 3 shows a flow chart of a method for adjusting a drain valve and introducing liquid condensate into an engine oil sump.
Figure 4:
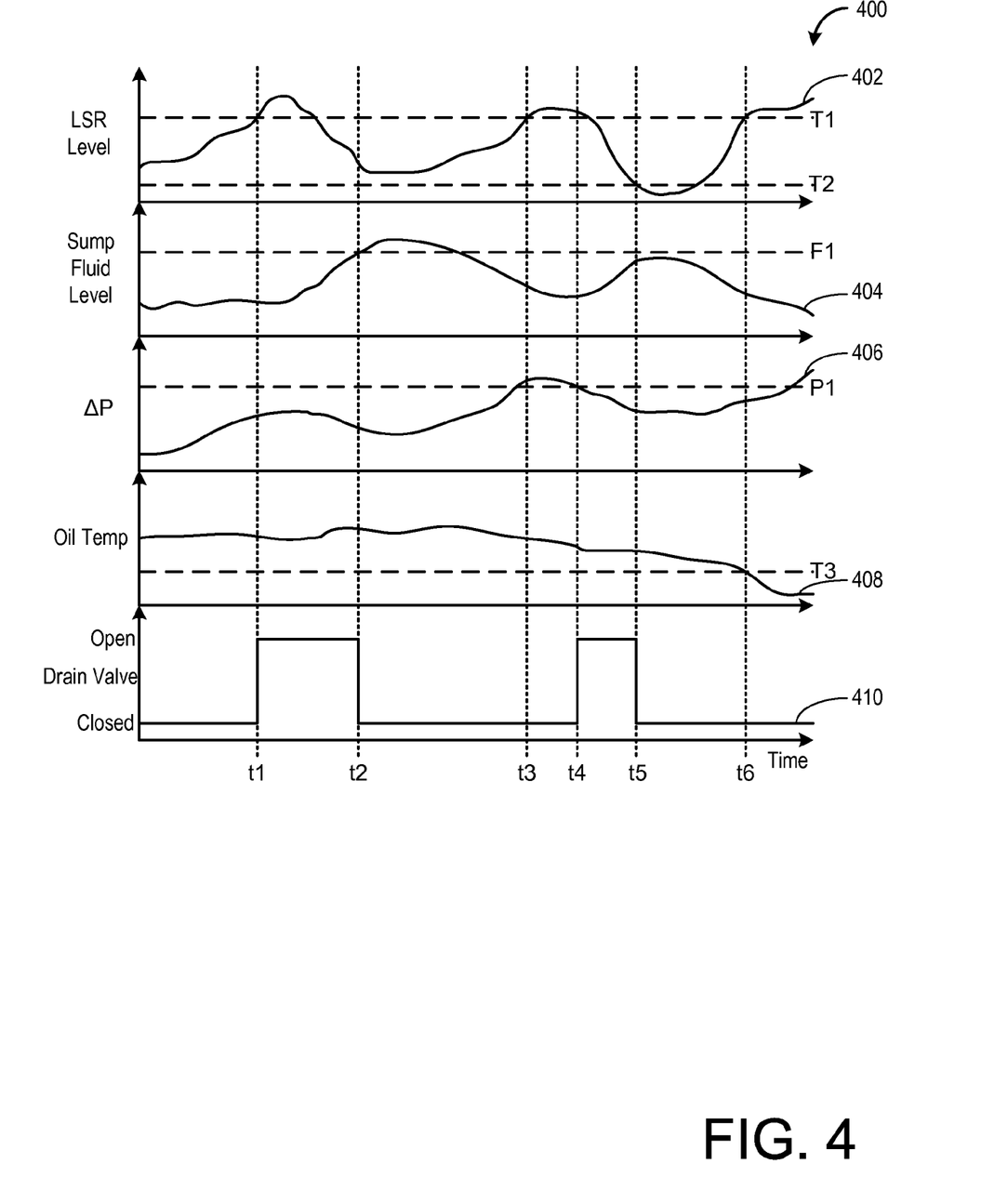
FIG. 4 shows a graphical example of adjusting a drain valve based on conditions of a liquid storage reservoir and an engine oil sump.

Now turning to FIG. 3, a method 300 for adjusting a drain valve and introducing liquid condensate into an engine oil sump is shown. The routine begins at 302 by estimating and/or measuring engine operating conditions. Engine operating conditions may include engine speed and load, MAP, humidity, air mass flow, barometric pressure (BP), fluid level in the liquid storage reservoir and the engine oil sump (e.g., from fluid level sensors 20 and 21, respectively), oil temperature, pressure in the liquid storage reservoir and engine oil sump, drain valve position, etc. At the start of method 300, the base drain valve position may be closed.

At 304, the controller may determine if the fluid or liquid condensate level in the liquid storage reservoir is greater than a first threshold level, T1. If the liquid condensate level in the liquid storage reservoir is not greater than the first threshold level T1, the controller maintains the drain valve closed at 306. However, if the liquid condensate level in the liquid storage reservoir is greater than the first threshold level T1, the routine continues on to 308 to determine if the oil temperature is greater than a threshold temperature. If the oil temperature is not greater than the threshold temperature, the drain valve remains closed at 306. The threshold temperature may be based on the oil temperature at which water, or drained condensate from the liquid storage reservoir, may evaporate. If the oil temperature is greater than the threshold temperature, the routine proceeds on to 310 to determine the pressure difference between the liquid storage reservoir and the engine oil sump.

The pressure difference between the liquid storage reservoir and the engine oil sump may be used to estimate a flow rate of fluid into the engine oil sump. For example, a larger pressure difference may result in a higher flow rate of fluid when the drain valve opens. As such, the flow rate may determine the rate of increase in fluid level in the engine oil sump. If the fluid level increases too quickly, the fluid level may exceed a maximum level. Thus, there may be a desired or target flow rate, based on the rate of evaporation of fluid in the engine sump (when oil temperature is greater than the threshold temperature). For example, the target flow rate may cause the fluid level in the engine oil sump to increase at a rate substantially equal to the evaporation rate. In another example, the target flow rate may cause the fluid level to increase at a rate lower than the evaporation rate. In yet another example, the pressure difference between the liquid storage reservoir and engine oil sump may be negative, such that fluid would not flow in the desired direction (e.g., from the reservoir to the sump). Thus, there may be a threshold range of pressure difference between the liquid storage reservoir and the engine sump, corresponding to a direction of flow and/or a threshold flow rate of fluid into the engine sump, the threshold rate of fluid based on the current fluid level, the fluid evaporation rate, and an oil temperature in the engine oil sump.

At 312, the routine determines whether the pressure difference between the liquid storage reservoir and the engine oil sump is within a threshold range. In one example, the threshold range may be a pressure difference between the liquid storage reservoir and the engine sump greater than zero (e.g., forward flow into engine sump) and less than a threshold difference. As discussed above, the threshold difference may correspond to a threshold flow rate of fluid into the engine sump. If the pressure difference is not within the threshold range, the routine maintains the drain valve closed at 306. However, if the pressure difference is within the threshold range, the routine continues on to 314 to determine if the fluid level in the engine oil sump is greater than a threshold fluid level. The threshold fluid level may be based on one or more of an oil temperature in the engine oil sump and an estimated fluid evaporation rate in the engine oil sump. For example, the threshold fluid level may increase for a higher estimated fluid evaporation rate and/or an increasing oil temperature in the engine oil sump. If the fluid level in the engine oil sump is not less than the threshold fluid level, the drain valve remains closed at 306. However, if the fluid level is less than the threshold fluid level, the routine may open the drain valve at 316. Opening the drain valve allows fluid to flow from the liquid storage reservoir to the engine oil sump.

In some embodiments, the drain valve may be movable into a plurality of positions (rather than just opened and closed). As such, the drain valve may be adjusted to control the flow rate of fluid into the engine oil sump. A target flow rate may be determined based on the fluid level in the engine oil sump, the estimated evaporation rate of fluid in the engine oil sump, and the amount of water or condensate in the liquid storage reservoir. For example, the target flow rate may decrease for a higher fluid level in the engine oil sump and/or a slower evaporation rate of fluid in the engine oil sump. The evaporation rate of fluid in the engine sump may be estimated based on one or more of oil temperature, pressure in the engine oil sump, or engine speed. In another example, the target flow rate may increase for a lower fluid level in the engine oil sump and a higher fluid level in the liquid storage reservoir.

The routine may continuously monitor the fluid levels in the liquid storage reservoir and engine oil sump using fluid level sensors 20 and 21. At 318, the routine determines whether the liquid condensate level in the liquid storage reservoir has reached a second threshold level, the fluid level in the engine oil sump has reached the threshold fluid level, or the pressure difference between the liquid storage reservoir and engine oil sump is outside the threshold range. If none of these conditions have been reached, the routine maintains the drain valve open and continues to drain liquid condensate into the engine oil sump at 320. When one or more of the conditions at 318 are reached, the routine closes the drain valve at 322 and the routine ends.

In this way, the position of a drain valve may be adjusted to control the flow of liquid from the liquid storage reservoir into the engine oil sump responsive to a liquid condensate level in the liquid storage reservoir, an oil temperature in the engine oil sump, a pressure difference between the liquid storage reservoir and the engine oil sump, and a fluid level in the engine oil sump.

Turning to FIG. 4, graph 400 shows example adjustments to a drain valve based on conditions of a liquid storage reservoir and an engine oil sump. Specifically, graph 400 shows changes in a liquid condensate (e.g., fluid) level in the liquid storage reservoir (LSR level) at plot 402, changes in fluid level in the engine oil sump (sump fluid level) at plot 404, changes in the pressure difference between the liquid storage reservoir and the engine oil sump ($\Delta P$) at plot 406, changes in oil temperature at plot 408, and changes in the position of the drain valve at plot 410. In this example, the drain valve is movable between an open and closed position, the open position allowing fluid to flow from the liquid storage reservoir to the engine oil sump. In an alternate embodiment, the drain valve may be adjustable between a plurality of positions to obtain different fluid flow rates.

Prior to time t1, the drain valve may be closed (plot 410). The liquid condensate level in the liquid storage reservoir may be between a first threshold level T1 and a second threshold level T2 (plot 402). The engine oil sump fluid level may be below a threshold fluid level F1 (plot 404), the pressure difference between the liquid storage reservoir and engine oil sump (e.g., pressure difference) may be less than a threshold difference P1 (plot 406), and the oil temperature may be above a threshold temperature T3 (plot 408). As such, prior to time t1, the drain valve may remain closed.

At time t1 the fluid level in the liquid storage reservoir may increase above first threshold level T1 (plot 402). At this time, the oil temperature remains above threshold temperature T3, the pressure difference remains less that the threshold difference P1, and the fluid level in the engine oil sump remains below the threshold fluid level F1. In response, a controller may open the drain valve, allowing condensate to drain from the liquid storage reservoir into the engine oil sump. The draining is illustrated in graph 400 by the decreasing fluid level in the liquid storage reservoir (plot 402) and the increasing fluid level in the engine oil sump (plot 404). The fluid continues to drain until time t2 when the fluid level in the engine oil sump reaches threshold fluid level F1 (plot 404). In response, the controller closes the drain valve at time t2. The water level in the liquid storage level may not have reached the second threshold level T2 at time t2 (plot 402). Despite this, the valve is closed responsive to the fluid level in the engine oil sump reaching threshold fluid level F1.

Between time t2 and time t3, the fluid level in the engine oil sump may decrease due to evaporation of the fluid (e.g., liquid condensate) and the condensate level in the liquid storage reservoir may increase due to increased draining of condensate from the CAC. At time t3, the condensate level in the liquid storage reservoir increases above first threshold level T1 (plot 402) while the fluid level in the engine oil sump remains below threshold fluid level F1 and the oil temperature remains above the threshold temperature T3 (plot 408). However, the drain valve remains closed at time t3 since the pressure difference is greater than threshold difference P1 (plot 406). This large pressure difference may create too large of a flow rate of fluid into the engine oil sump. Thus, the drain valve remains closed until the pressure difference decreases below the threshold difference P1 at time t4. Since all conditions are met for opening the drain valve at time t4, the controller may open the drain valve (plot 410). As a result, the fluid level in the liquid storage reservoir decreases while the fluid level in the engine oil sump increases. At time t5, the liquid condensate level in the liquid storage reservoir reaches second threshold level T2. In response, the controller closes the drain valve at time t5. The fluid level in the liquid storage reservoir may increase while the valve remains closed between time t5 and time t6. At time t6, the fluid level in the liquid storage reservoir increases above first threshold level T1. However, the oil temperature is less than the threshold temperature T3 (plot 410). As a result, the drain valve remains closed.

In this way, condensate may be automatically drained from a CAC to a liquid storage reservoir and a drain valve in the liquid storage reservoir may be adjusted in response to conditions of the liquid storage reservoir and an engine oil sump. The adjusting of the drain valve may include opening the drain valve responsive to the liquid condensate level in the liquid storage reservoir being greater than a first threshold level, the oil temperature being greater than a threshold temperature, the pressure difference between the liquid storage reservoir and the engine oil sump being less than a threshold difference, and the fluid level in the engine oil sump being less than a threshold fluid level (shown at time t1 and time t4). The drain valve may then be closed when one or more of the liquid condensate level in the liquid storage reservoir reaches a second threshold level and the fluid level in the engine oil sump reaches the threshold fluid level (shown at time t2 and time t5).

In this way, condensate may be drained from a CAC and introduced into a positive crankcase ventilation flow and/or an engine oil sump. The condensate may be drained from the CAC into a liquid storage reservoir where a portion of the liquid condensate may evaporate. The evaporated condensate may then enter the positive crankcase ventilation flow for disposal in the engine. The liquid condensate may be controllably drained into an engine oil sump where it may evaporate. Draining of the liquid condensate into the engine oil sump may be controlled by a method for adjusting a drain valve, based on conditions of the liquid storage reservoir and the engine oil sump. In this way, liquid condensate may be removed from a CAC and disposed of while reducing the likelihood of engine misfire.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An engine method for removing condensate from a charge air cooler, comprising:
   automatically draining water condensate from the charge air cooler to a liquid storage reservoir;
   adjusting a drain valve in the liquid storage reservoir in response to conditions of the liquid storage reservoir and an engine oil sump to introduce drained condensate to the engine oil sump; and
   evaporating at least a portion of the drained condensate in the liquid storage reservoir and directing the evaporated portion to a PCV flow.

2. The method of claim 1, wherein the liquid storage reservoir is positioned adjacent to a block of the engine.

3. The method of claim 1, wherein the liquid storage reservoir is positioned adjacent to an exhaust manifold.

4. The method of claim 1, further comprising directing the PCV flow into the engine.

5. The method of claim 4, further comprising adjusting the drain valve based on at least one of a pressure difference between the liquid storage reservoir and the engine oil sump, a liquid condensate level in the liquid storage reservoir, an oil temperature, a fluid level in the engine oil sump, and an estimated rate of evaporation in the engine oil sump.

6. An engine method for removing condensate from a charge air cooler, comprising:
   automatically draining water condensate from the charge air cooler to a liquid storage reservoir; and
   adjusting a drain valve in the liquid storage reservoir in response to conditions of the liquid storage reservoir and an engine oil sump, where the conditions include a fluid level in the engine oil sump, a liquid condensate level in the liquid storage reservoir, an oil temperature in the engine oil sump, and a pressure difference between the liquid storage reservoir and the engine oil sump.

7. The method of claim 6, wherein the adjusting includes controlling an opening of the drain valve to a flow rate of fluid into the engine oil sump.

8. The method of claim 7, wherein the flow rate is determined based on at least one of the fluid level in the engine oil sump, the oil temperature in the engine oil sump, an evaporation rate of fluid in the engine oil sump, and an amount of liquid condensate in the liquid storage reservoir.

9. The method of claim 6, wherein the adjusting includes opening the drain valve responsive to the liquid condensate level in the liquid storage reservoir being greater than a first threshold level, the oil temperature being greater than a threshold temperature, the pressure difference between the liquid storage reservoir and the engine oil sump being within a threshold range, and the fluid level in the engine oil sump being less than a threshold fluid level.

10. The method of claim 9, further comprising, closing the drain valve when one or more of the liquid condensate level in the liquid storage reservoir reaches a second threshold level, the fluid level in the engine oil sump reaches the threshold fluid level, and the pressure difference between the liquid storage reservoir and the engine oil sump is outside the threshold range.

11. The method of claim 9, wherein the threshold temperature is based on an oil temperature at which drained condensate evaporates.

12. The method of claim 9, wherein the threshold range of pressure difference between the liquid storage reservoir and the engine oil sump corresponds to a threshold flow rate of fluid into the engine oil sump, the threshold flow rate of fluid based on the fluid level in the engine oil sump, the oil temperature in the engine oil sump, and an estimated fluid evaporation rate in the engine oil sump.

13. The method of claim 9, wherein the threshold fluid level is based on one or more of the oil temperature in the engine oil sump and an estimated fluid evaporation rate in the engine oil sump.

14. The method of claim 13, wherein the threshold fluid level increases with one or more of increasing oil temperature in the engine oil sump and an increasing estimated fluid evaporation rate in the engine oil sump.

15. An engine system for removing condensate from a charge air cooler, comprising:
   an engine including a cylinder head, an engine block, and an engine oil sump;
   a positive crankcase ventilation system, with a positive crankcase ventilation flow path leading into an engine intake manifold;
   the charge air cooler with an automatic drain tube to drain water condensate from the charge air cooler to a liquid storage reservoir,
   the liquid storage reservoir positioned adjacent to the engine block for storing liquid condensate in the liquid storage reservoir and evaporating a portion of the drained liquid water condensate into water vapor directed to the positive crankcase ventilation flow path;
   a drain valve, connected between the liquid storage reservoir and engine oil sump; and
   a controller with non-transitory computer readable executable instructions to adjust a position of the drain valve to control flow of liquid from the liquid storage reservoir into the engine oil sump responsive to a fluid level in the engine oil sump.

16. The system of claim 15, wherein the executable instructions further include executable instructions to adjust the position of the drain valve responsive to a liquid condensate level in the liquid storage reservoir.

* * * * *